US012645901B1

(12) United States Patent
Lanka et al.

(10) Patent No.: US 12,645,901 B1
(45) Date of Patent: Jun. 2, 2026

(54) ENHANCED PRIVACY USING ANONYMIZED LABELING AND RELATED INSTRUCTIONS

(71) Applicant: Amazon Technologies, Inc., Seattle, WA (US)

(72) Inventors: Murali Krishna Lanka, Hyderabad (IN); Praveen Gupta, Hyderabad (IN); Naga Venkata Naveena Lasya Chalavadi, Hyderabad (IN); Rohit Malshe, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/967,008

(22) Filed: Dec. 3, 2024

(51) Int. Cl.
| | |
|---|---|
| *G06K 7/14* | (2006.01) |
| *G01C 21/34* | (2006.01) |
| *G03B 21/00* | (2006.01) |
| *G06F 21/44* | (2013.01) |
| *G06Q 10/083* | (2023.01) |

(52) U.S. Cl.
CPC ........... *G06K 7/1404* (2013.01); *G01C 21/34* (2013.01); *G03B 21/00* (2013.01); *G06F 21/445* (2013.01); *G06Q 10/083* (2013.01)

(58) Field of Classification Search
CPC ...... G06K 7/1404; G01C 21/34; G03B 21/00; G06Q 10/083
USPC ........................................................ 235/375
See application file for complete search history.

(56) References Cited

U.S. PATENT DOCUMENTS

| | | | | |
|---|---|---|---|---|
| 2017/0061156 | A1* | 3/2017 | Hamamoto | ......... G06F 21/6254 |
| 2017/0351995 | A1 | 12/2017 | Siegel et al. | |
| 2018/0315015 | A1 | 11/2018 | Pientka et al. | |
| 2019/0311325 | A1* | 10/2019 | Reblin | ............... G06Q 10/0836 |
| 2020/0314642 | A1* | 10/2020 | Shirani-Mehr | ....... H04W 12/02 |
| 2021/0012030 | A1* | 1/2021 | Soni | .................... G06F 21/6254 |
| 2024/0143829 | A1* | 5/2024 | Fleck | .................. G06F 21/6245 |

FOREIGN PATENT DOCUMENTS

EP                   3489871  A1      5/2019

OTHER PUBLICATIONS

International Search Report and Written Opinion for PCT Application No. PCT/US2025/057908, mailed Mar. 18, 2026, 11 pages.

\* cited by examiner

*Primary Examiner* — Ahshik Kim

(74) *Attorney, Agent, or Firm* — Eversheds Sutherland (US) LLP

(57) ABSTRACT

Devices, systems, and methods for enhancing user privacy by using anonymized delivery labels may include identifying, by a first device, a computer-readable code on a parcel to be delivered to a delivery address, wherein delivery information of the parcel is absent from the parcel; sending, by the first device, a unique identifier of the parcel included in the computer-readable code to a second device that has pre-authenticated to a third device associated with maintaining delivery information for packages; sending, by the second device, the unique identifier to the third device; determining, by the third device, based on receiving the unique identifier, that delivery information criteria for the parcel are satisfied; sending, by the third device, the delivery information to the second device based on determining that the delivery information criteria for the parcel are satisfied; and causing presentation of the delivery information.

20 Claims, 6 Drawing Sheets

⬐— 100

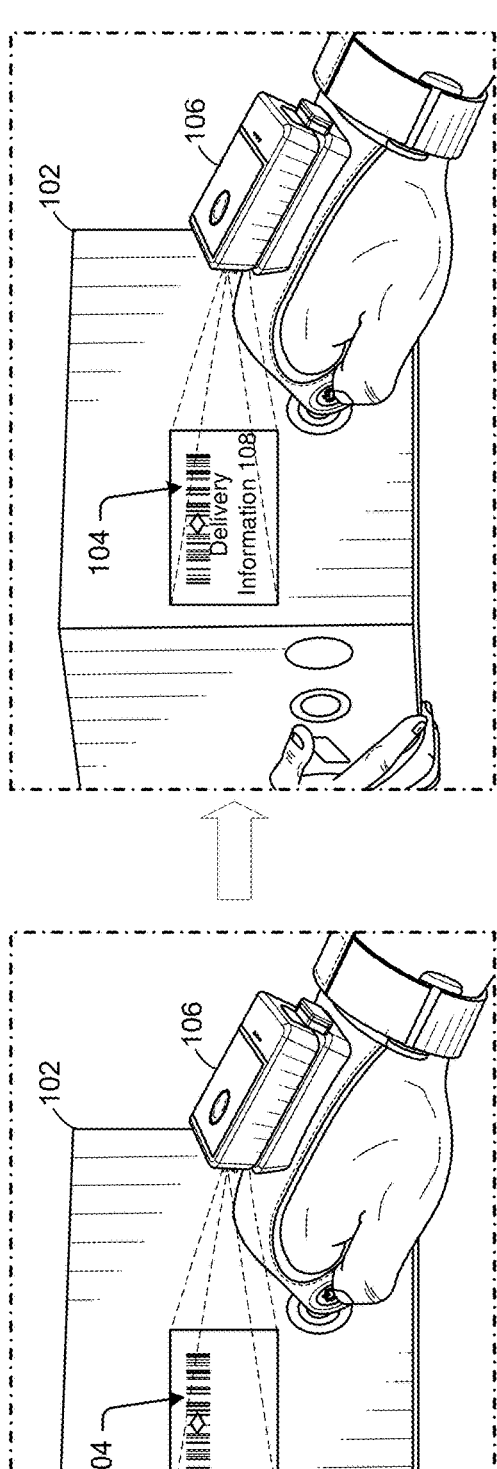
FIG. 1

500

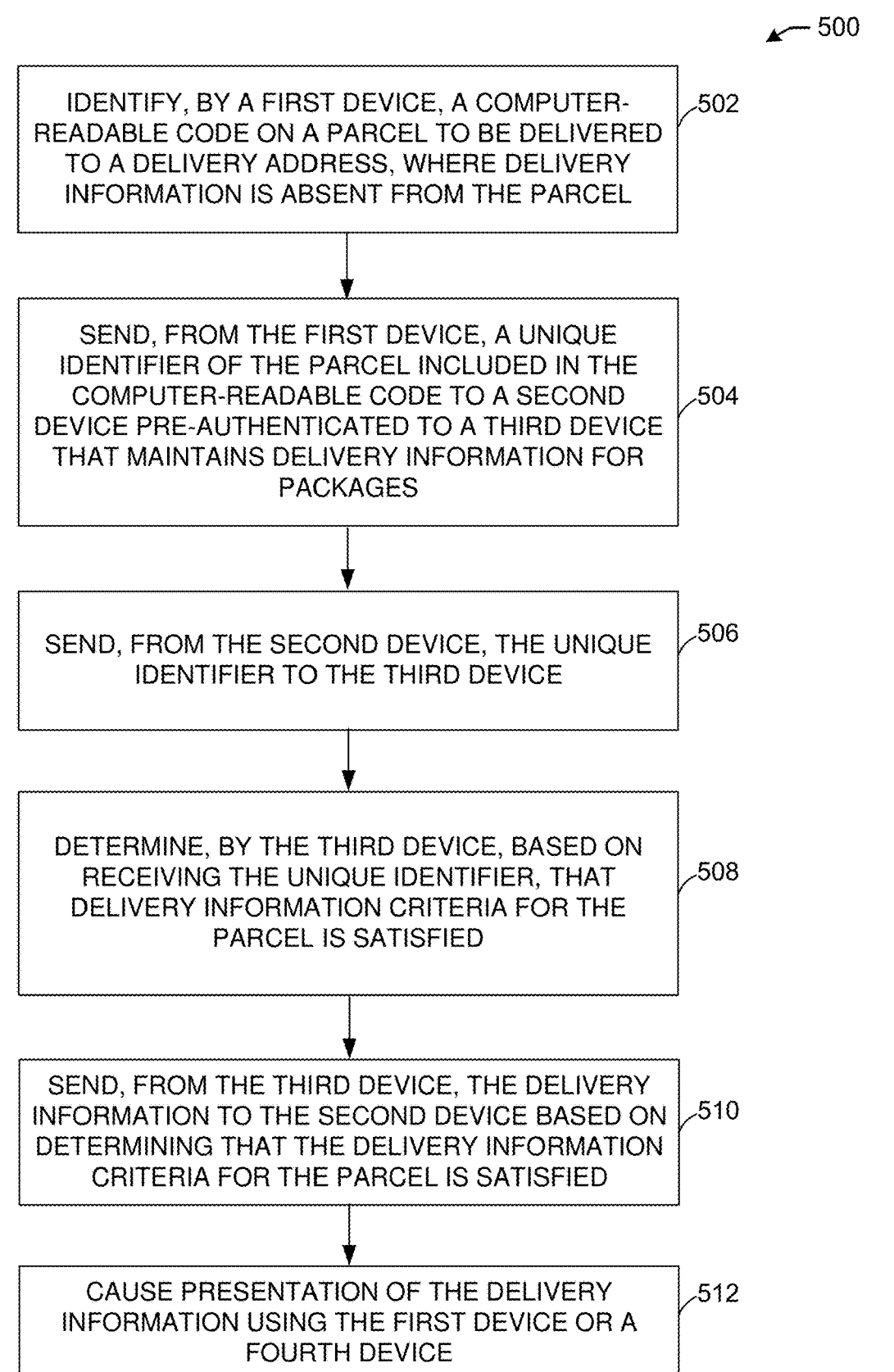

IDENTIFY, BY A FIRST DEVICE, A COMPUTER-READABLE CODE ON A PARCEL TO BE DELIVERED TO A DELIVERY ADDRESS, WHERE DELIVERY INFORMATION IS ABSENT FROM THE PARCEL
502

SEND, FROM THE FIRST DEVICE, A UNIQUE IDENTIFIER OF THE PARCEL INCLUDED IN THE COMPUTER-READABLE CODE TO A SECOND DEVICE PRE-AUTHENTICATED TO A THIRD DEVICE THAT MAINTAINS DELIVERY INFORMATION FOR PACKAGES
504

SEND, FROM THE SECOND DEVICE, THE UNIQUE IDENTIFIER TO THE THIRD DEVICE
506

DETERMINE, BY THE THIRD DEVICE, BASED ON RECEIVING THE UNIQUE IDENTIFIER, THAT DELIVERY INFORMATION CRITERIA FOR THE PARCEL IS SATISFIED
508

SEND, FROM THE THIRD DEVICE, THE DELIVERY INFORMATION TO THE SECOND DEVICE BASED ON DETERMINING THAT THE DELIVERY INFORMATION CRITERIA FOR THE PARCEL IS SATISFIED
510

CAUSE PRESENTATION OF THE DELIVERY INFORMATION USING THE FIRST DEVICE OR A FOURTH DEVICE
512

602 — HARDWARE PROCESSOR
624 — INSTRUCTIONS

604 — MAIN MEMORY
624 — INSTRUCTIONS

606 — STATIC MEMORY
624 — INSTRUCTIONS

620 — NETWORK INTERFACE

630 — ANTENNA(S)

610 — GRAPHICS DISPLAY DEVICE

612 — INPUT DEVICE

614 — UI NAVIGATION DEVICE

616 — STORAGE DEVICE
622 — MACHINE-READABLE MEDIUM
624 — INSTRUCTIONS

618 — SIGNAL GENERATION DEVICE

619 — LABEL MODULES

632 — POWER DEVICE

608 —

634 — OUTPUT CONTROLLER

626 — COMMUNICATIONS NETWORK

ENHANCED PRIVACY USING ANONYMIZED LABELING AND RELATED INSTRUCTIONS

BACKGROUND

When packages are being delivered, shipping labels affixed to the packages provide important information such as the recipient and a delivery location for the recipient. Delivery routing, such as navigation instructions and maps, are based on the delivery address. However, user privacy may be enhanced by preventing the display and availability of user information such as name and address on delivery packages.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates an example temporary presentation of delivery information for a parcel, in accordance with one or more embodiments of the present disclosure.

FIG. 5 is an example flow of a process for enhancing user privacy by using anonymized delivery labels and related delivery instructions, in accordance with one or more embodiments of the present disclosure.

Figure 2:
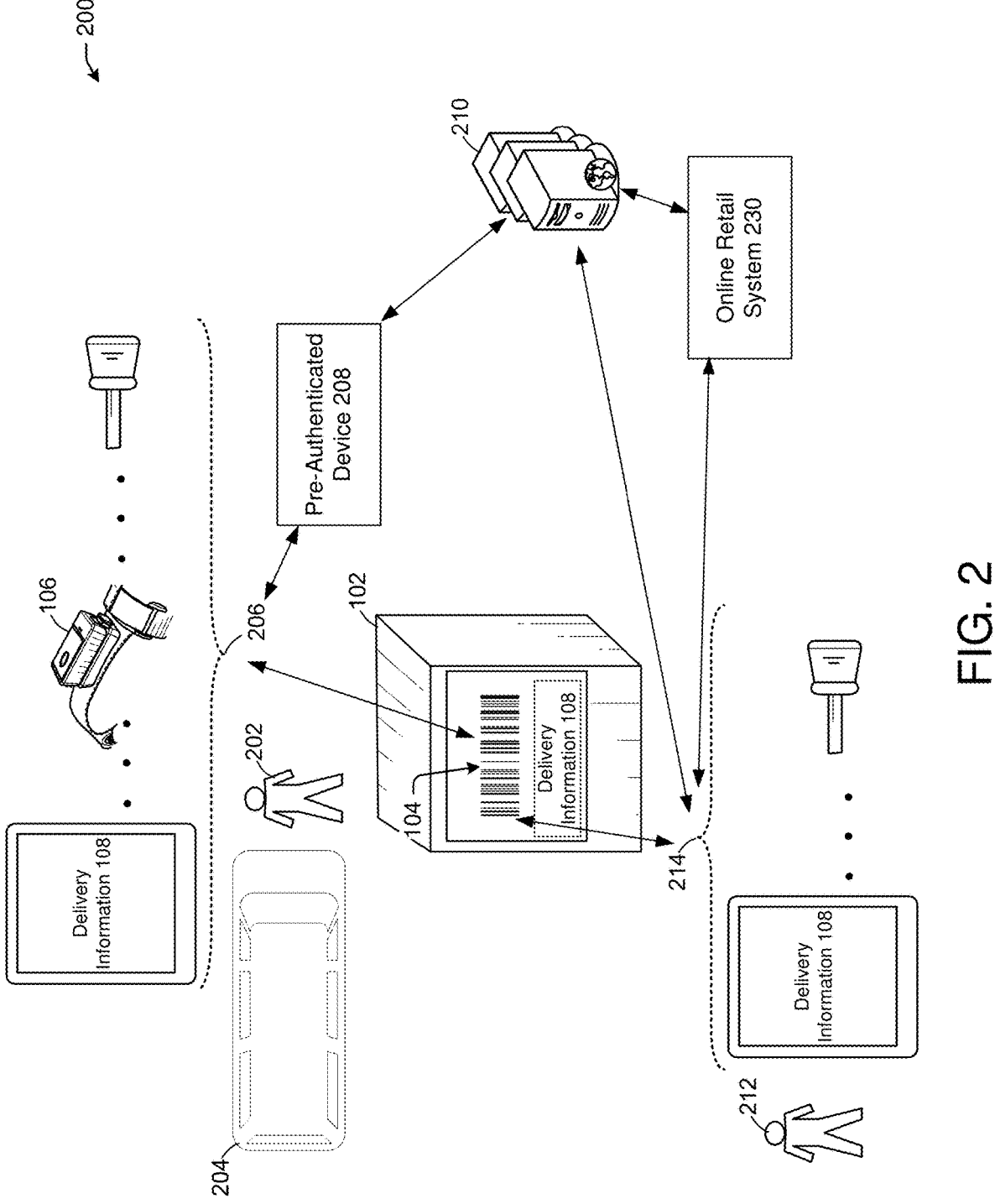
FIG. 2 shows an example system for enhancing user privacy by using anonymized delivery labels and related delivery instructions, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhancing user privacy by using anonymized delivery labels and related delivery instructions.

During a package's journey from storage location to delivery address, the recipient's name and delivery address are necessary for final delivery, but only during the final steps of the delivery. For example, a package being loaded from a fulfilment center onto a delivery vehicle does not need to reveal the recipient's name and address, nor does the package need to expose the recipient's name and address while being transported by the delivery vehicle or even when left at the delivery address where someone else may see the information presented on a delivery label. However, the deliverer needs to be made aware of the final delivery address and related delivery instructions at some time during the delivery journey to allow for final delivery, and the recipient needs to be able to identify whether the package was correctly delivered for them (e.g., as opposed to an accidental delivery intended to be delivered to someone else or to another address). In addition, related navigation instructions for a deliverer may depend on the final delivery address, so revealing the final delivery address too early may expose the recipient's personal information.

There is therefore a need for anonymized package labeling that allows a deliverer to identify a package recipient's delivery address for final delivery, but not until the package is proximate enough to the delivery address and/or other criteria are satisfied. For example, in a warehouse scenario, a person may be authorized to view relevant delivery information for a parcel, such as storage aisles, dock doors, parcel clusters, delivery stations, and the like. Such information normally may need to be presented on a parcel (e.g., via one or more labels), but by using the enhanced anonymized labeling techniques herein, the amount of content in parcel labels, and therefore their size, may be reduced by withholding such information from the labels and conditioning the presentation of the withheld information on the satisfaction of some criteria. In addition to parcel location criteria, other criteria on which the presentation of the delivery information may be conditioned may include a requesting user, a requesting user device, a date/time, and the like.

In addition, there is a need to facilitate real-time delivery instructions, which may change based on time of day, weather, real-time package location, and/or updated recipient instructions, without needing to print a new shipping label or expose the recipient's information until the package is proximate enough to the delivery address.

In one or more embodiments, a shipping label for a delivery package may exclude personal user information, such as a delivery recipient's name and delivery address. Instead, the shipping label may include a unique computer-readable identifier (e.g., string, barcode, QR code, RFID, etc.) that, when read by a computer, may be translated into the recipient's name and delivery address, and may reveal specific delivery instructions (e.g., gate codes, specific locations to leave the package, etc.). To enhance user privacy, the computer-readable identifier may be provided by a scanning device to a device that has pre-authenticated to a remote system that manages access to the delivery information, including the recipient's name, delivery address, and delivery instructions. The pre-authenticated device may receive the unique identifier from the scanning device, send the unique identifier to the remote system, which may recognize that the device is already authenticated, and may provide the delivery address and optionally the recipient's name and delivery instructions.

In one or more embodiments, the remote system may be in communication with one or more applications that facilitate the purchase and fulfillment option selection and customization of delivery packages. For example, an online retail system may allow users to select and purchase items to be delivered according to user-selected fulfillment options. When a purchase is made through one or more user interfaces of the online retail system, the online retail system may provide the fulfillment data (e.g., item identifiers, delivery addresses, recipients, delivery instructions, etc.) to the remote system. Fulfillment information may update in real time. For example, a recipient may use the online retail system interfaces to update a delivery name, address, and/or delivery instructions at any time. Such an update may be provided in real-time to the remote system to update delivery addresses, navigation instructions for the deliverer, and delivery instructions. Recipients may customize fulfillment options based on various conditions, such as the time of day or day of delivery. For example, a recipient may specify one delivery address at one time and another address at another time, and/or may provide different delivery instructions for different times (e.g., different door/gate codes, different specific locations at the delivery address where the package is to be left, etc.). The remote system may determine, based on the criteria, which recipient, delivery address, and/or delivery instruction to apply to the delivery of a respective package, and may update delivery navigation instructions to the deliver accordingly. For example, a delivery driver whose vehicle is carrying a package to be delivered at one address and/or according to one set of delivery instructions at a particular time may experience delays due to weather, traffic, or the like, and therefore may be more likely to deliver the package at a later time at which the recipient has specified different a different address and/or instruction at the address. The remote system may update this information in real-time, including navigation instructions.

In one or more embodiments, the revelation of delivery information not included on the shipping label may be time and/or location based, and/or may be based on whether the requesting user and/or user device is authorized to view certain delivery information. For example, using geofencing, the remote system may, when provided with positioning data of a delivery vehicle, of a device of the deliverer, and/or of a shipping label of a package on a delivery vehicle, determine whether a package is within a geofence (e.g., a threshold distance/proximate to the delivery address withheld from the shipping label). The deliverer's navigation instructions may provide a geographic area, such as a town, zip code, neighborhood, or street of the delivery address without the full/exact (e.g., building, house, and/or apartment address, Post Office box, etc.) address. When the location information indicates to the remote system that the package is within a threshold distance of the delivery address, such as within the geofence for the delivery address, the remote system may reveal (e.g., via navigation instructions and/or other presentation of a vehicle or deliverer user device) the final delivery address for a package. For added privacy, once a package has been delivered (e.g., based on a deliverer's input to a user interface indicative of the delivery), the navigation history (or other historical data) of a navigation application (or other delivery application) may erase the delivery address. In other embodiments, some users may be authorized to view certain delivery information such as warehouse storage details pertaining to a parcel, so when a user requests such details of the delivery information, the user and/or user device may be verified and the delivery information that they are permitted to view may be presented using any of the techniques described herein.

In one or more embodiments, the way in which the recipient name, delivery address, and/or delivery instructions (e.g., not presented on the shipping label) may be presented may provide enhanced user privacy. For example, a device accessible to the deliverer (e.g., the deliverer's device, delivery vehicle device, etc.) may receive optical image data to be optically projected (e.g., onto a package or otherwise) when the device reads the device's unique identifier of the label. In this manner, the presentation of the recipient's name, delivery address, and/or specific delivery instructions may be temporary (e.g., in comparison to being printed on the package label) and available only to users of a particular device. A device that presents the recipient's name, delivery address, and/or specific delivery instructions in any format may require user authentication. Alternatively or in addition, encryption techniques and/or secure transmission protocols may be used when transmitting the information to and from the pre-authenticated device. For example, the device that that presents the recipient's name, delivery address, and/or specific delivery instructions may require an authentication of the device and/or the user so that encrypted or otherwise secure data may be decrypted or otherwise translated (e.g., encryption keys may be provided to the device upon authentication, etc.) so that only authorized devices and users may view the recipient's name, delivery address, and/or specific delivery instructions.

In some embodiments, when the remote system verifies that a package has reached the delivery address, the remote system may facilitate printing of a shipping label that includes the recipient's name, delivery address, and/or specific delivery instructions. In this manner, an updated shipping label may be printed conditionally to ensure user privacy.

When the shipping label excludes the recipient's name, delivery address, and/or specific delivery instructions, the recipient or another intermediate party (e.g., a receptionist, a bellhop, etc.) needs a way to determine whether the package is for them or for a particular recipient at the building address. To provide this information, the shipping label's unique identifier may be computer-readable by a user device and/or may be entered into a user interface. When the unique identifier is read by a user device or entered into a user interface, and the device and/or the device's user has authenticated to the remote system, the user device and/or user interface may receive the recipient's name, delivery address, and/or specific delivery instructions from the remote system and may present the information via the device/user interface (e.g., using text, image, video, audio, and/or image projection).

The enhanced techniques herein for anonymized labeling therefore improve user privacy and also allow for smaller labels that do not need to include as much information. Using an all-electronic process as described herein, no relabeling may be necessary for a parcel, as the withheld information does not need to be re-printed on one or more labels at various times (e.g., arrivals at warehouses, arrivals at delivery addresses, etc.). Also, in the use cases with RFID labels (radio frequency identifiers) for parcels, the labels do not need to be facing a scanner device or be in any particular orientation relative to the scanning device to be read.

Illustrative Processes and Use Cases

FIG. 1 illustrates an example temporary presentation of delivery information for a parcel, in accordance with one or more embodiments of the present disclosure.

Referring to FIG. 1, a parcel 102 being delivered to a recipient at a delivery address may have a computer-readable code 104 (e.g., bar code, QR code, unique identifier, or the like), such as affixed to the parcel 102 as a label or printed on the parcel 102. When the computer-readable code 104 is read by a device 106, the device 106 may present delivery information 108 when certain conditions are satisfied. The delivery information 108 may include a recipient's name, the delivery address, and optional delivery instructions for the parcel 102.

In one or more embodiments, the parcel 102 may exclude personal user information, such as a delivery recipient's name and delivery address. Instead, the parcel 102 may include a unique computer-readable identifier (e.g., the computer-readable code 104) that, when read by the device 106, may be translated into the delivery information 108. To enhance user privacy, the computer-readable code 104 may be provided by the device 106 to a device (as shown in FIG. 2) that has pre-authenticated to a remote system that manages access to the delivery information 108, including the recipient's name, delivery address, and delivery instructions. The pre-authenticated device may receive the unique identifier from the device 106, send the computer-readable code 104 to the remote system, which may recognize that the device is already authenticated, and may provide the delivery address and optionally the recipient's name and delivery instructions via the delivery information 108.

In one or more embodiments, the revelation of the delivery information 108 not included on a shipping label or otherwise not presented on the parcel 102 may be time and/or location based. For example, using geofencing, the remote system may, when provided with positioning data of a delivery vehicle, of a device of the deliverer, and/or of the parcel 102, determine whether the parcel 102 is within a geofence (e.g., a threshold distance/proximate to the delivery address withheld from the shipping label). The deliverer's navigation instructions may provide a geographic area, such as a town, zip code, neighborhood, or street of the delivery address without the full/exact (e.g., building, house, and/or apartment address, Post Office box, etc.) address. When the location information indicates to the remote system that the parcel 102 is within a threshold distance of the delivery address, such as within the geofence for the delivery address, the remote system may reveal the final delivery address for the parcel 102 (e.g., via the delivery information 108).

In one or more embodiments, the way in which the delivery information 108 may be presented may provide enhanced user privacy. For example, the device 106 may receive optical image data to be optically projected (e.g., onto a package or otherwise) when the device 106 reads the computer-readable code 104. In this manner, the presentation of the delivery information 108 may be temporary (e.g., in comparison to being printed on the parcel 102/label) and available only to users of a particular device. The device 106 that presents the recipient's name, delivery address, and/or specific delivery instructions in any format may require user authentication. Alternatively or in addition, encryption techniques and/or secure transmission protocols may be used when transmitting the information to and from the pre-authenticated device. For example, the device 106 that that presents the recipient's name, delivery address, and/or specific delivery instructions may require an authentication of the device and/or the user so that encrypted or otherwise secure data may be decrypted or otherwise translated (e.g., encryption keys may be provided to the device upon authentication, etc.) so that only authorized devices and users may view the recipient's name, delivery address, and/or specific delivery instructions.

In some embodiments, when the remote system verifies that the parcel 102 has reached the delivery address, the remote system may facilitate printing of a shipping label that includes the delivery information 108. In this manner, an updated shipping label may be printed conditionally to ensure user privacy.

When the parcel 102 or its shipping label excludes the recipient's name, delivery address, and/or specific delivery instructions, the recipient or another intermediate party (e.g., a receptionist, a bellhop, etc.) needs a way to determine whether the package is for them or for a particular recipient at the building address. To provide this information, the computer-readable code 104 may be readable by a user device and/or may be entered into a user interface. When the computer-readable code 104 is read by a user device or entered into a user interface, and the device and/or the device's user has authenticated to the remote system, the user device and/or user interface may receive the recipient's name, delivery address, and/or specific delivery instructions from the remote system and may present the information via the device/user interface (e.g., using text, image, video, audio, and/or image projection).

FIG. 2 shows an example system 200 for enhancing user privacy by using anonymized delivery labels and related delivery instructions, in accordance with one or more embodiments of the present disclosure.

Referring to FIG. 2, a deliverer 202 may delivery parcels (e.g., the parcel 102 of FIG. 1) using a delivery vehicle 204. The deliverer 202 may use any of devices 206 (e.g., including the device 106, a smartphone, a tablet, a headset or another wearable device, a vehicle display or console, or the like) to read the computer-readable code 104 of the parcel 102 (e.g., printed on the parcel 102 or on a label affixed to the parcel 102. When any of the devices 206 reads the computer-readable code 104, it may provide a unique identifier of the parcel 102 represented by the computer-readable code 104 to a pre-authenticated device 208. The pre-authenticated device 208 may be pre-authenticated to a remote system 210 so that when the pre-authenticated device 208 provides the unique identifier of the parcel 102 to the remote system 210, the remote system 210 may verify that the device 206 is authorized to present the delivery information 108 without needing to re-authenticate the device 206 or the deliverer 202. As a result, the remote system 210 may provide the delivery information 108 to the pre-authenticated device 208, which may relay the delivery information 108 to the device 206 for presentation.

Still referring to FIG. 2, a recipient 212 of the parcel 102, such as at the delivery address, may use any of devices 214 (e.g., smartphones, laptops, tablets, wearable devices, etc.) to read or enter the computer-readable code 104 and provide the unique identifier of the parcel 102 to the remote system 210. When the remote system 210 verifies that the recipient 212 and/or the device 214 is authorized to view the delivery information 108, the remote system 210 may provide the delivery information 108 to the device 214 for presentation.

In one or more embodiments, the parcel 102 may exclude personal user information, such as a delivery recipient's name and delivery address. Instead, the parcel 102 may include a unique computer-readable identifier (e.g., the computer-readable code 104) that, when read by the devices 206, may be translated into the recipient's name and delivery address, and may reveal specific delivery instructions (e.g., gate codes, specific locations to leave the package, etc.). To enhance user privacy, the computer-readable code 104 may be provided by the devices 206 to the pre-authenticated device 208 that has pre-authenticated to the remote system 210 that manages access to the delivery information 108, including the recipient's name, delivery address, and delivery instructions. The pre-authenticated device 208 may receive the unique identifier from the device 206, send the unique identifier to the remote system 210, which may recognize that the pre-authenticated device 208 is already authenticated, and may provide the delivery address and optionally the recipient's name and delivery instructions.

In one or more embodiments, the remote system 210 may be in communication with one or more applications (e.g., online retail system 230) that facilitate the purchase and fulfillment option selection and customization of delivery packages. For example, the online retail system 230 may allow users to select and purchase items to be delivered according to user-selected fulfillment options. When a purchase is made through one or more user interfaces of the online retail system 230, the online retail system 230 may provide the fulfillment data (e.g., item identifiers, delivery addresses, recipients, delivery instructions, etc.) to the remote system 210. Fulfillment information may update in real time. For example, the recipient 212 may use the online retail system 230 interfaces to update a delivery name, address, and/or delivery instructions at any time. Such an update may be provided in real-time to the remote system 210 to update delivery addresses, navigation instructions for the deliverer 202, and delivery instructions. Recipients may customize fulfillment options based on various conditions, such as the time of day or day of delivery. For example, the recipient 212 may specify one delivery address at one time and another address at another time, and/or may provide different delivery instructions for different times (e.g., different door/gate codes, different specific locations at the delivery address where the package is to be left, etc.). The remote system 210 may determine, based on the criteria, which recipient, delivery address, and/or delivery instruction to apply to the delivery of a respective package, and may update delivery navigation instructions to the deliverer 202 accordingly. For example, a delivery driver 202 whose vehicle 204 is carrying a package to be delivered at one address and/or according to one set of delivery instructions at a particular time may experience delays due to weather, traffic, or the like, and therefore may be more likely to deliver the package at a later time at which the recipient has specified different a different address and/or instruction at the address. The remote system 210 may update this information in real-time, including navigation instructions.

In one or more embodiments, the revelation of delivery information 108 not included on the shipping label may be time and/or location based. For example, using geofencing, the remote system 210 may, when provided with positioning data of the delivery vehicle 204, of the device 206, and/or of the parcel 102 on a delivery vehicle, determine whether a package is within a geofence (e.g., a threshold distance/proximate to the delivery address withheld from the shipping label). The deliverer's navigation instructions may provide a geographic area, such as a town, zip code, neighborhood, or street of the delivery address without the full/exact (e.g., building, house, and/or apartment address, Post Office box, etc.) address. When the location information indicates to the remote system 210 that the parcel 102 is within a threshold distance of the delivery address, such as within the geofence for the delivery address, the remote system 210 may reveal (e.g., via navigation instructions and/or other presentation of a vehicle or deliverer user device) the final delivery address for a package. For added privacy, once a package has been delivered (e.g., based on a deliverer's input to a user interface indicative of delivery), the navigation history (or other historical data) of a navigation application (or other delivery application) may erase the delivery address.

In one or more embodiments, the way in which the recipient name, delivery address, and/or delivery instructions (e.g., not presented on the shipping label) may be presented may provide enhanced user privacy. For example, the device 206 to the deliverer (e.g., the deliverer's device, delivery vehicle device, etc.) may receive optical image data to be optically projected (e.g., onto a package or otherwise) when the device 206 reads the device's unique identifier of the label. In this manner, the presentation of the recipient's name, delivery address, and/or specific delivery instructions may be temporary (e.g., in comparison to being printed on the package label) and available only to users of a particular device. The device 206 that presents the recipient's name, delivery address, and/or specific delivery instructions in any format may require user authentication. Alternatively or in addition, encryption techniques and/or secure transmission protocols may be used when transmitting the information to and from the pre-authenticated device 208. For example, the device 206 that that presents the recipient's name, delivery address, and/or specific delivery instructions may require an authentication of the device 206 and/or the user so that encrypted or otherwise secure data may be decrypted or otherwise translated (e.g., encryption keys may be provided to the device upon authentication, etc.) so that only authorized devices and users may view the recipient's name, delivery address, and/or specific delivery instructions via the delivery information 108.

In some embodiments, when the remote system 210 verifies that the parcel 102 has reached the delivery address, the remote system 210 may facilitate printing of a shipping label that includes the delivery information 108. In this manner, an updated shipping label may be printed conditionally to ensure user privacy.

When the shipping label excludes the recipient's name, delivery address, and/or specific delivery instructions, the recipient 212 or another intermediate party (e.g., a receptionist, a bellhop, etc.) needs a way to determine whether the parcel 102 is for them or for a particular recipient at the building address. To provide this information, the shipping label's unique identifier may be computer-readable by the device 214 and/or may be entered into a user interface. When the unique identifier is read by the device 214 or entered into a user interface, and the device 214 and/or the device's user has authenticated to the remote system 210, the user device 214 and/or user interface may receive the recipient's name, delivery address, and/or specific delivery instructions from the remote system 210 and may present the delivery information 108 via the device/user interface (e.g., using text, image, video, audio, and/or image projection).

Figure 3:
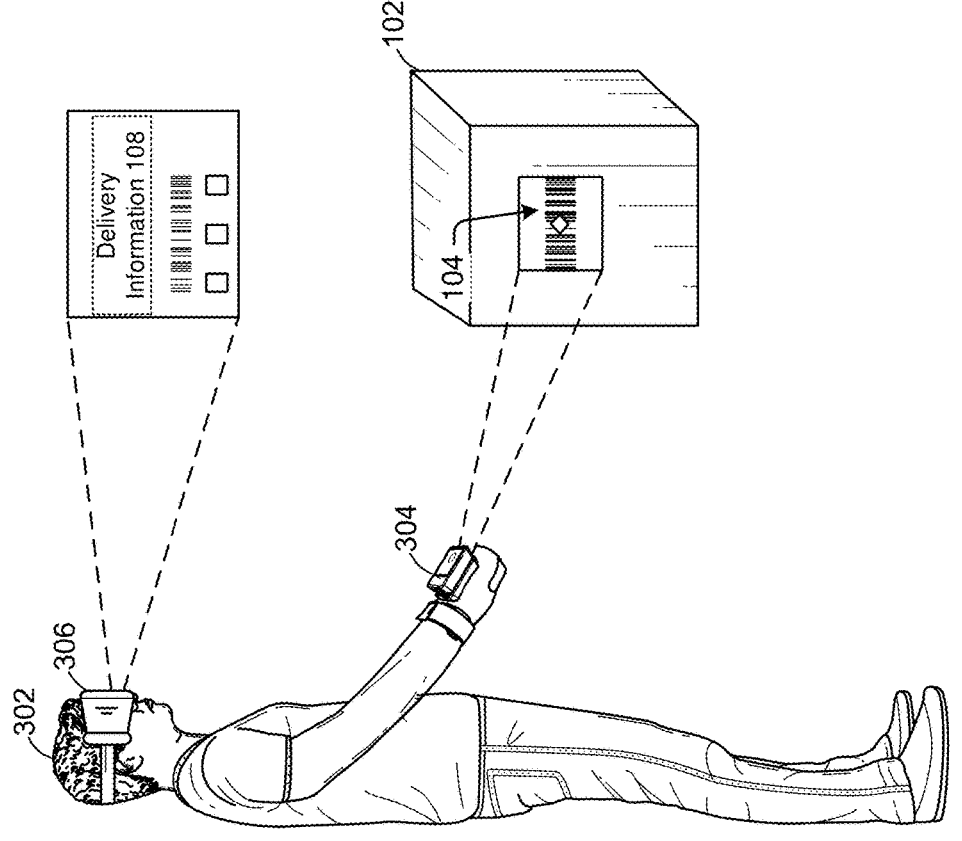
FIG. 3 illustrates an example presentation of delivery information with one device when a parcel's unique identifier is read by a different device, in accordance with one or more embodiments of the present disclosure.

FIG. 3 illustrates an example presentation of delivery information with one device when a parcel's unique identifier is read by a different device, in accordance with one or more embodiments of the present disclosure.

In FIG. 3, a person 302 may use any of the devices 206 or devices 214 of FIG. 2 (e.g., including the device 106 of FIG. 1) to read the computer-readable code 104 of the parcel 102. When the unique identifier of the computer-readable code 104 is provided to the remote system 210 and the person 302 and/or device 304 and/or device 306 are verified as authorized to present the delivery information 108 (e.g., via projection or other temporary digital presentation, or via printing of a label). As shown in FIG. 3 as an example, the device 306 may be a headset (e.g., augmented/virtual reality headset), which may present a digital image of the delivery information 108 based on the device 304 reading the computer-readable code 104. Alternatively or in addition, presentation of the delivery information 108 may be in the form of audio (e.g., a voice reading the delivery information 108), or image data such as shown in FIG. 1. In this manner, the device that presents the delivery information 108 need not be the same device that reads the computer-readable code 104 with the unique identifier of the parcel 102.

Figure 4:
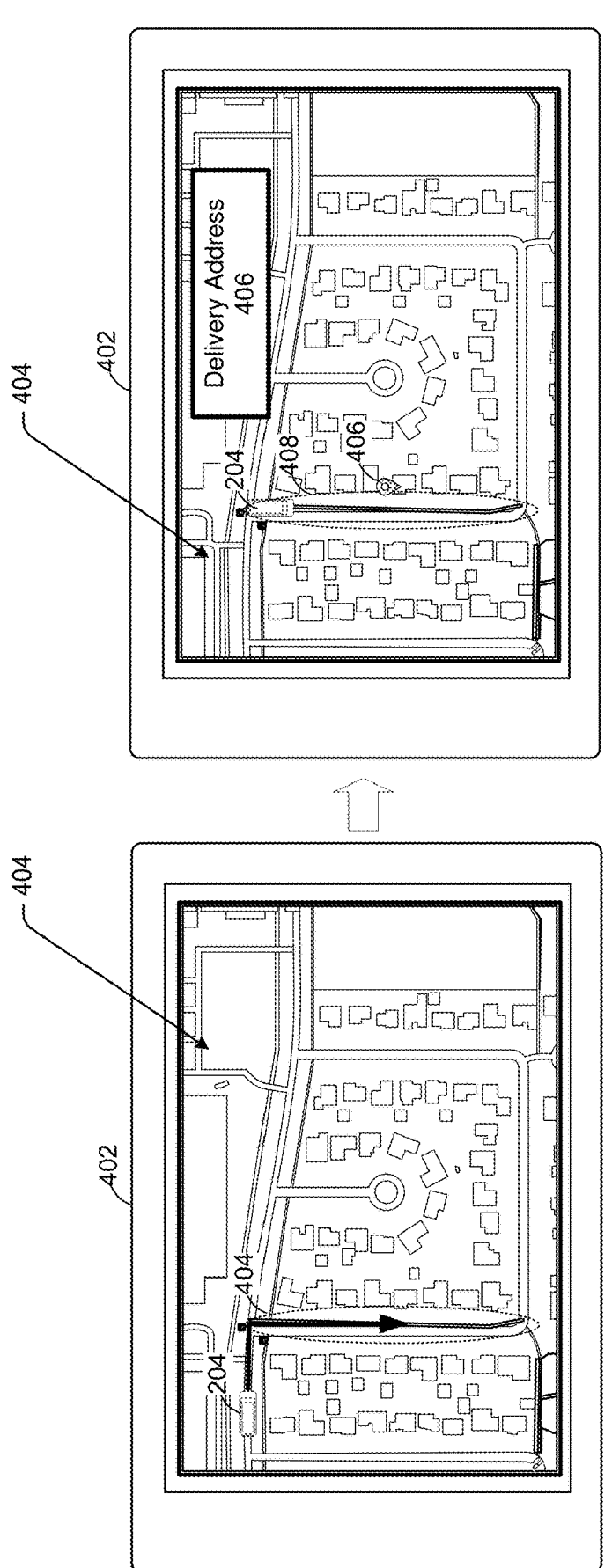
FIG. 4 illustrates example navigation instructions for parcel delivery, in accordance with one or more embodiments of the present disclosure.

FIG. 4 illustrates example navigation instructions for parcel delivery, in accordance with one or more embodiments of the present disclosure.

Referring to FIG. 4, a device 402 (e.g., one of the devices 206 of the deliverer 202 of FIG. 2) may present real-time navigation instructions 404, including a current location of the delivery vehicle 204 and/or the device 402, map data (e.g., cities, streets, addresses, etc.), and turn-by-turn instructions. Until the delivery vehicle 204 (or the parcel 102 transported by the delivery vehicle 204) is within a threshold distance of the delivery address 406 of the recipient, the navigation instructions (e.g., provided by the remote system 210) may provide directions to a geographic area (e.g., a geofence, a street, a neighborhood, a town, etc.) without revealing the actual delivery address, which is part of the delivery information 108.

Still referring to FIG. 4, when the parcel 102 is within the threshold distance of the delivery address (e.g., within a geofence 408 or otherwise), the navigation instructions 404 may update to show the actual delivery address 406 for the parcel 102. The delivery address 406 may include a street name, a number, a building, an apartment, etc.

In one or more embodiments, the remote system 210 may be in communication with the online retail system 230 of FIG. 2, which may allow users to select and purchase items to be delivered according to user-selected fulfillment options. When a purchase is made through one or more user interfaces of the online retail system 230, the online retail system 230 may provide the fulfillment data (e.g., item identifiers, delivery addresses, recipients, delivery instructions, etc.) to the remote system 210. Fulfillment information may update in real time. For example, a recipient may use the online retail system 230 interfaces to update a delivery name, address, and/or delivery instructions at any time. Such an update may be provided in real-time to the remote system 210 to update delivery addresses, the navigation instructions 404 for the deliverer, and delivery instructions. Recipients may customize fulfillment options based on various conditions, such as the time of day or day of delivery. For example, a recipient may specify one delivery address at one time and another address at another time, and/or may provide different delivery instructions for different times (e.g., different door/gate codes, different specific locations at the delivery address where the package is to be left, etc.). The remote system 210 may determine, based on the criteria, which recipient, delivery address, and/or delivery instruction to apply to the delivery of a respective package, and may update delivery navigation instructions 404 to the delivery address accordingly. For example, a delivery driver whose vehicle 204 is carrying a package to be delivered at one address and/or according to one set of delivery instructions at a particular time may experience delays due to weather, traffic, or the like, and therefore may be more likely to deliver the package at a later time at which the recipient has specified different a different address and/or instruction at the address. The remote system 210 may update this information in real-time, including the navigation instructions 404.

In one or more embodiments, the revelation of the delivery information 108 not included on the shipping label may be time and/or location based. For example, using geofencing (e.g., the geofence 408), the remote system 210 may, when provided with positioning data of the delivery vehicle 204, of the device 402 of the deliverer 202, and/or of a shipping label of a parcel 102 on the delivery vehicle 204, determine whether the parcel 102 is within the geofence 408 (e.g., a threshold distance/proximate to the delivery address 406 withheld from the shipping label). The deliverer's navigation instructions 404 may provide a geographic area, such as a town, zip code, neighborhood, or street of the delivery address without the full/exact (e.g., building, house, and/or apartment address, Post Office box, etc.) address. When the location information indicates to the remote system 210 that the parcel 102 is within a threshold distance of the delivery address 406, such as within the geofence 408 for the delivery address 406, the remote system 210 may reveal (e.g., via the navigation instructions 404) the final delivery address 406 for the parcel 102. For added privacy, once the parcel 102 has been delivered (e.g., based on a deliverer's input to a user interface indicative of the delivery), the navigation history (or other historical data) of a navigation application (or other delivery application used to present the navigation instructions 404) may erase the delivery address 406.

FIG. 5 is an example flow of a process 500 for enhancing user privacy by using anonymized delivery labels and related delivery instructions, in accordance with one or more embodiments of the present disclosure.

At block 502, a device (or system, e.g., the system 200 of FIG. 2) may identify a computer-readable code presented on a parcel to be delivered to a delivery address. The computer-readable code (e.g., the computer-readable code 104 of FIG. 1) may include a bar code, QR code, RFID, or the like, which may include a unique identifier for the parcel. In this manner, the delivery address, name of the recipient, and optional delivery instructions may be absent from the parcel (e.g., including any labels affixed to the parcel). Other delivery information that may be excluded from the label may include warehouse storage information such as aisles, dock doors, clusters, delivery stations, and the like. Identifying the computer-readable code may include scanning the computer-readable code, receiving the RFID, or entering a string of the computer-readable code into a user interface.

At block 504, the device (or system) may send the unique identifier of the parcel to a second device that has been pre-authenticated to a third device that maintains delivery information for parcels. The device that scans or otherwise receives the computer-readable code may provide the computer-readable code to the second device.

At block 506, the second device may send the computer-readable code or the unique identifier extracted from the computer-readable code to the third device.

At block 508, the third device may receive the unique identifier and determine that delivery information criteria for the parcel have been satisfied. For example, the criteria may include whether is within a threshold distance (e.g., a geofence or other geographic threshold) of the delivery address, and/or whether the requesting user/device is authorized to view any of the delivery information (and which of the information). Determining the location of the parcel may be based on location information of the first or second device, a vehicle transporting the parcel, or location information within hardware of a label on the parcel, any of which may be communicated to the third device to determine location information. When the delivery information criteria for the parcel are not satisfied, the third device may withhold the delivery address, recipient's name, and any relevant delivery instructions for the parcel to maintain user privacy.

At block 510, when the parcel is within the threshold distance of the delivery address, the third device may send any of the delivery information to the second device (e.g., any of the delivery information permitted given which delivery information criteria is satisfied, such as user/device, location, time, etc.) to be distributed to the first device or to a different fourth device where a person may view the delivery information. Similarly, when the delivery information criteria for the parcel is not satisfied, the third device may withhold any of the delivery information from navigation instructions that the third device may provide to navigate a deliverer of the parcel to the delivery address. When the parcel is within the threshold distance, the third device may send the delivery address and other optional delivery information to a navigation application to navigate the deliverer to the exact delivery address.

At block 512, the second device may cause presentation at the first device or fourth device of the delivery information that the user and/or the first or fourth device is permitted to present. In this manner, the delivery information may be withheld until the parcel is close to the delivery address to maintain user privacy. At any time, the delivery information may change, either based on user updates or based on conditions such as time, weather, or the like. For example, a user may update their delivery information while the parcel is in transit, and/or may include time and/or weather or other conditions, such as the delivery address may be different at different times, or delivery instructions may specify a particular location to leave a package given the time of day or the weather. The presentation may include optical image data, VR/AR image data, user interface data, audio data (e.g., audio of a voice reading the delivery information), or other techniques as described herein.

The examples herein are not meant to be limiting.

Figure 6:
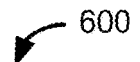
FIG. 6 illustrates a block diagram of an example machine upon which any of one or more techniques (e.g., methods) may be performed, in accordance with one or more example embodiments of the present disclosure.

FIG. 6 illustrates a block diagram of an example machine upon which any of one or more techniques (e.g., methods) may be performed, in accordance with one or more example embodiments of the present disclosure.

In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 600 (e.g., computer system) may include a hardware processor 602 (e.g., a central processing unit (CPU), a graphics processing unit (GPU), a hardware processor core, a tensor processing unit (TPU), or any combination thereof), a main memory 604 and a static memory 606, some or all of which may communicate with each other via an interlink (e.g., bus 608). The machine 600 may further include a power device 632, a graphics display device 610, an input device 612 (e.g., a keyboard, an image scanner, an infrared scanner, a barcode scanner, a QR scanner, or the like), and a user interface UI navigation device 614 (e.g., a mouse). In an example, the graphics display device 610, input device 612, and UI navigation device 614 may be a touch screen display. The machine 600 may additionally include a storage device 616, a signal generation device 618, one or more label modules 619 (e.g., representing the components of FIGS. 1-4, and capable of performing the operations of FIGS. 1-5), and a network interface 620 coupled to antenna(s) 630. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 620 may include one or more physical jacks (e.g., Ethernet, coaxial, or phone jacks) or one or more antennas to connect to the communications network 626. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to an object with a type, associated data, a set of methods that operate on it, and, if applicable, relationships to other resources. Additionally or alternatively, the term "compute resource" or "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and the like. The term "network resource" or "communication resource" at least in some examples refers to resources that are accessible by computer devices/systems via a communications network. The term "system resources" at least in some examples refers to any kind of shared entities to provide services, and includes computing and/or network resources. System resources may be considered as a set of coherent functions, network data objects or services, accessible through a server where such system resources reside on a single host or multiple hosts and are clearly identifiable.

The term "cloud service provider" or "CSP" at least in some examples refers to an organization that operates or otherwise provides cloud resources including, for example, centralized, regional, and/or edge data centers and/or the like. In some examples, the term "cloud computing" refers to computing resources and services offered by a CSP.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The terms "instantiate," "instantiation," and the like at least in some examples refers to the creation of an instance. In some examples, an "instance" also at least in some examples refers to a concrete occurrence of an object, which may occur, for example, during execution of program code.

What is claimed is:

1. A method for enhancing user privacy by using anonymized delivery labels, the method comprising:

pre-authenticating a first device to a second device associated with maintaining delivery information for packages, the delivery information comprising delivery recipients, delivery addresses, and delivery instructions;

reading, by a scanner of a third device, a computer-readable code on a parcel to be delivered to a delivery address, wherein a recipient's name and the delivery address of the parcel are absent from the parcel;

sending, by the third device, a unique identifier of the parcel included in the computer-readable code to the pre-authenticated first device;

sending, by the pre-authenticated first device, the unique identifier to the second device;

determining, by the second device, based on receiving the unique identifier, that the parcel is within a threshold distance of the delivery address;

sending, by the second device, the delivery address to the pre-authenticated first device based on determining that the parcel is within the threshold distance; and causing temporary presentation, on the parcel, of the delivery address using the third device or a fourth device.

2. The method of claim 1, wherein causing the temporary presentation comprises causing projection of optical image data, comprising the delivery address, on the parcel.

3. The method of claim 1, further comprising:

causing presentation of first navigation instructions to a geographic area comprising the delivery address, wherein presentation of a street number of the delivery address is absent from the first navigation instructions; and causing presentation of second navigation instructions, based on determining that the parcel is within the threshold distance, of second navigation instructions showing the street number of the delivery address.

4. The method of claim 1, wherein the second device receives the unique identifier at a first time, the method further comprising:

determining first delivery instructions applicable to the parcel at the first time; and causing temporary presentation of the first delivery instructions on the parcel using the third device or the fourth device.

5. A method for enhancing user privacy by using anonymized delivery labels, the method comprising:

identifying, by a first device, a computer-readable code on a parcel to be delivered to a delivery address, wherein delivery information for the parcel is absent from the parcel;

sending, by the first device, a unique identifier of the parcel included in the computer-readable code to a second device associated with maintaining delivery information for packages, the delivery information for the packages comprising delivery recipients, delivery addresses, and delivery instructions;

determining, by the second device, based on receiving the unique identifier, that delivery information criteria for the parcel is satisfied, wherein the delivery information criteria is indicative of a location of the parcel and that a user or device to which the delivery information is to be presented is authenticated to the second device; and causing presentation, by the second device, of the delivery information using the first device or a third device based on determining that the delivery information criteria are satisfied.

6. The method of claim 5, wherein the delivery information criteria comprises the parcel being within a threshold distance of a delivery address to where the parcel is to be delivered, and wherein the delivery information comprises the delivery address.

7. The method of claim 5, wherein the delivery information criteria comprises at least one of the parcel being within a threshold distance of a location or the first device or the third device, and a user of the first device or the third device is permitted to view a portion of the delivery information, and wherein the portion of the delivery information comprises at least one of a storage aisle for the parcel, a dock door for the parcel, a parcel cluster for the parcel, or a delivery station for the cluster.

8. The method of claim 5, wherein identifying the computer-readable code on the parcel comprises scanning a QR code or a bar code using the first device, or receiving a radio frequency identifier (RFID) of the parcel.

9. The method of claim 5, wherein causing presentation of the delivery information comprises causing temporary presentation of the delivery information.

10. The method of claim 9, wherein causing the temporary presentation comprises causing projection of optical image data, comprising the delivery information, on the parcel.

11. The method of claim 9, wherein causing the temporary presentation comprises presenting the delivery information via a display of the first device or the third device.

12. The method of claim 11, wherein the third device is a virtual reality or augmented reality headset, and wherein causing the temporary presentation comprises presenting the delivery information via the virtual reality or augmented reality headset.

13. The method of claim 7, further comprising:

causing presentation of first navigation instructions to a geographic area comprising a delivery address for the parcel, wherein presentation of a street number of the delivery address is absent from the first navigation instructions; and causing presentation of second navigation instructions, based on determining that the parcel is within the threshold distance, of second navigation instructions showing the street number of the delivery address.

14. The method of claim 5, wherein the second device receives the unique identifier at a first time, the method further comprising:

determining first delivery instructions applicable to the parcel at the first time; and causing temporary presentation of the first delivery instructions on the parcel using the first device or the third device at the first time.

15. The method of claim 14, further comprising:

identifying second delivery instructions, different than the first delivery instructions, applicable to the parcel at a second time; and causing temporary presentation of the second delivery instructions on the parcel using the first device or the third device at the second time.

16. The method of claim 15, wherein the second delivery instructions comprise a user update to the first delivery instructions.

17. The method of claim 11, wherein causing the temporary presentation further comprises temporarily presenting a name of the recipient of the parcel at a delivery address for the parcel.

18. A system for enhancing user privacy by using anonymized delivery labels, the system comprising:

a first device configured to identify unique identifiers of parcels for delivery; and a second device associated with maintaining delivery information for packages, the delivery information comprising delivery recipients, delivery addresses, and delivery instructions, wherein the first device is configured:

to identify a computer-readable code on a parcel to be delivered to a delivery address, wherein delivery information of the parcel is absent from the parcel, and send a unique identifier of the parcel included in the computer-readable code to the second device, wherein the second device is configured to:

receive the unique identifier, determine that delivery information criteria for the parcel are satisfied, wherein the delivery information criteria is indicative of a location of the parcel and that a user or device to which the delivery information is to be presented is authenticated to the second device, and cause presentation of the delivery information using the first device or a third device based on determining that the delivery information criteria are satisfied.

19. The system of claim 18, wherein the delivery information criteria comprises the parcel being within a threshold distance of a delivery address to where the parcel is to be delivered, and wherein the delivery information comprises the delivery address.

20. The system of claim 18, wherein the delivery information criteria comprises at least one of the parcel being within a threshold distance of a location or the first device or the third device, and a user of the first device or the third device is permitted to view a portion of the delivery information, and wherein the a portion of the delivery information comprises at least one of a storage aisle for the parcel, a dock door for the parcel, a parcel cluster for the parcel, or a delivery station for the cluster.

* * * * *